United States Patent
Doherty et al.

(10) Patent No.: US 7,170,977 B2
(45) Date of Patent: Jan. 30, 2007

(54) TELEPHONE INTERFACE FOR A HANDICAPPED INDIVIDUAL

(75) Inventors: Eamon Doherty, Boonton, NJ (US); Suhail Abdullah Lutfi Ali Harmozi, Clifton, NJ (US); Preetham Michael, Harrison, NJ (US); Dency Baskaradhas, Denver, CO (US)

(73) Assignee: Fairleigh Dickinson University, Teaneck, NJ (US)

( * ) Notice: Subject to any disclaimer, the term of this patent is extended or adjusted under 35 U.S.C. 154(b) by 70 days.

(21) Appl. No.: 10/814,957

(22) Filed: Mar. 31, 2004

(65) Prior Publication Data

US 2005/0025290 A1     Feb. 3, 2005

Related U.S. Application Data

(60) Provisional application No. 60/459,330, filed on Apr. 1, 2003.

(51) Int. Cl.
    *H04M 11/00*     (2006.01)
(52) U.S. Cl. ...................... 379/52; 379/93.17
(58) Field of Classification Search .................. 379/52, 379/93.17; 704/271
    See application file for complete search history.

(56) References Cited

U.S. PATENT DOCUMENTS

| | | | |
|---|---|---|---|
| 4,182,956 A | | 1/1980 | Funk, Jr. et al. |
| 4,713,535 A | | 12/1987 | Rhoades |
| 4,746,913 A | * | 5/1988 | Volta ........................... 345/184 |
| 4,908,845 A | * | 3/1990 | Little ........................... 379/52 |
| 5,991,723 A | * | 11/1999 | Duffin ........................... 379/52 |
| 5,995,590 A | * | 11/1999 | Brunet et al. .................. 379/52 |
| 6,503,197 B1 | * | 1/2003 | Nemirovski ................ 704/271 |
| 6,701,162 B1 | * | 3/2004 | Everett ........................ 704/271 |
| 6,833,786 B1 | * | 12/2004 | Sun et al. .............. 340/539.12 |
| 6,879,669 B1 | * | 4/2005 | Perepa et al. .................. 379/52 |
| 6,950,501 B1 | * | 9/2005 | Chaturvedi et al. ........... 379/52 |
| 6,952,809 B2 | * | 10/2005 | Beranek et al. ............. 715/856 |

FOREIGN PATENT DOCUMENTS

| | | |
|---|---|---|
| JP | 62 298822 A | 12/1987 |
| JP | 01 147617 A | 7/1989 |
| JP | 04 025924 A | 1/1992 |
| JP | 06 139007 A | 5/1994 |
| WO | WO-96/12248 A | 4/1996 |

* cited by examiner

*Primary Examiner*—Stella Woo
(74) *Attorney, Agent, or Firm*—Lowenstein Sandler PC

(57) ABSTRACT

An interface device that enables a severely handicapped individual to control a telephone to place and terminate calls and to carry on a conversation regardless of whether the individual can speak or use his or her hands. A personal computer is programmed to display a menu for the handicapped individual to read wherein a selectable area of the menu is active for a period of time. After the period of time, the next selectable area of the menu is active for another period of time. The program makes each menu selection active in a predetermined order. A sensor that detects voluntary motion of the handicapped individual is connected to a transducer that converts the motion detected into a computer input, such as a mouse "click," which selects the active area on the menu. Advantageously, the process may begin again or may move to another menu, depending upon the item selected.

7 Claims, 7 Drawing Sheets

TELEPHONE INTERFACE FOR A HANDICAPPED INDIVIDUAL

CROSS-REFERENCE TO RELATED APPLICATION

This patent application is related to and claims the benefit of U.S. Provisional Application No. 60/459,330, filed Apr. 1, 2003; the disclosure of which is hereby incorporated by reference in its entirety.

FIELD OF THE INVENTION

This invention relates to the field of telephone devices, and, more specifically, to a device that enables a handicapped individual to communicate via telephone.

BACKGROUND OF THE INVENTION

Using a telephone is something most people take for granted. The variety and quantity of telephony devices and telephone networks (e.g., landline, wireless, Internet, etc.) in use today illustrates how ubiquitous our need for communication is. Telephones are used to communicate emergency situations to the proper authorities, communicates needs, communicate other information and just to communicate. There is one segment of the population, however, that cannot communicate using commonly-available telephony devices.

Many individuals have one or more handicaps that prevent them from using common, everyday telephony devices. Over the past few years, some telephony devices that work in the context of the existing telephone network were developed to meet certain, specific needs. For example, telephones with large buttons are available for those with poor eyesight or difficulty in eye-hand coordination. Telephone devices for the deaf ("TDD's" as they are called in the art) provide a display and a keyboard to facilitate communication for the hearing impaired, speech impaired or both. These devices are a sample of currently available special-needs telephones. These devices, however, generally only assist an individual with one or a limited number of handicaps. Individuals with multiple handicaps, severe handicaps or both still cannot use these devices.

Therefore, a problem exists in the current art to facilitate telephonic communication for the severely handicapped. These individuals have the same needs to call for emergencies, call for needs and just to communicate as the rest of the population but have no means to use any of the available telecommunications networks.

SUMMARY OF THE INVENTION

This problem is solved and a technical advance is achieved in the art by an interface device that enables a severely handicapped individual to control a telephone to place and receive calls on any of the telephone networks and to carry on a conversation regardless of whether the individual can speak or use his or her hands. A computer, such as a personal computer (widely known as a "PC") is programmed to display a menu for the handicapped individual to read, Unlike prior art menus, however, a selectable area of the menu is highlighted or "active" for a period of time. After the period of time, the next selectable area of the menu is active for another period of time (which is referred to herein as "scanning"). Thus, this program scans each entry, making each menu selection active in a predetermined order for a period of time. Advantageously, this order may be sequentially.

A sensor detects voluntary motion of the handicapped individual and is connected to a transducer that converts the motion detection to a computer input. According to this exemplary embodiment of this invention, the input acts in the same manner as a mouse "click," which selects the active area on the menu. Advantageously, the scanning may begin again or another menu may be presented, depending upon the item selected.

In one exemplary embodiment, this invention provides a personal computer ("PC") connected to a telephone network (i.e., the public switched telephone network, a wireless telephone network, an Internet telephony network, etc.) via a voice modem. The PC is confided to control the modem to dial a call, transmit voice messages and then terminate the call. In this exemplary embodiment of this invention, the voice message is synthesized speech derived from text selected or input by the handicapped individual.

Accordingly, a first menu is displayed to the individual. This menu presents selectable preset ("speed calling") telephone numbers and individual numbers that can be selected to build a telephone number. When the telephone number is complete, a telephone call may be automatically placed over a telephone network or may be placed when another menu selection is made (e.g., "dial" is selected).

The PC then displays a different screen that presents a menu of phrases, words and letters to the individual. The individual selects a word or phrase and the PC causes a text-to-speech unit to speak the selected word or phrase through the modem. Further, the individual may build words by selecting individual letters. Each letter appears in a box on the screen when it is selected. When the word is complete, the user selects the word, which is then sent to the text-to-speech unit. When the individual is finished with the call, he or she can select a disconnect menu entry, which controls the modem to end the call.

Advantageously, each item on each menu is active for a predetermined period of time. The period of time is variable, depending upon the individual's ability to read the item, process this information and make a selection. The layout of the menu may be set up to group like words and numbers or in any manner that is most easily understood by the individual. The sensor may be a piezo-electric transducer in contact with a voluntary muscle.

BRIEF DESCRIPTION OF THE DRAWINGS

A more complete understanding of this invention may be obtained from a consideration of this specification taken in conjunction with the drawings, in which.

DETAILED DESCRIPTION

Figure 1:
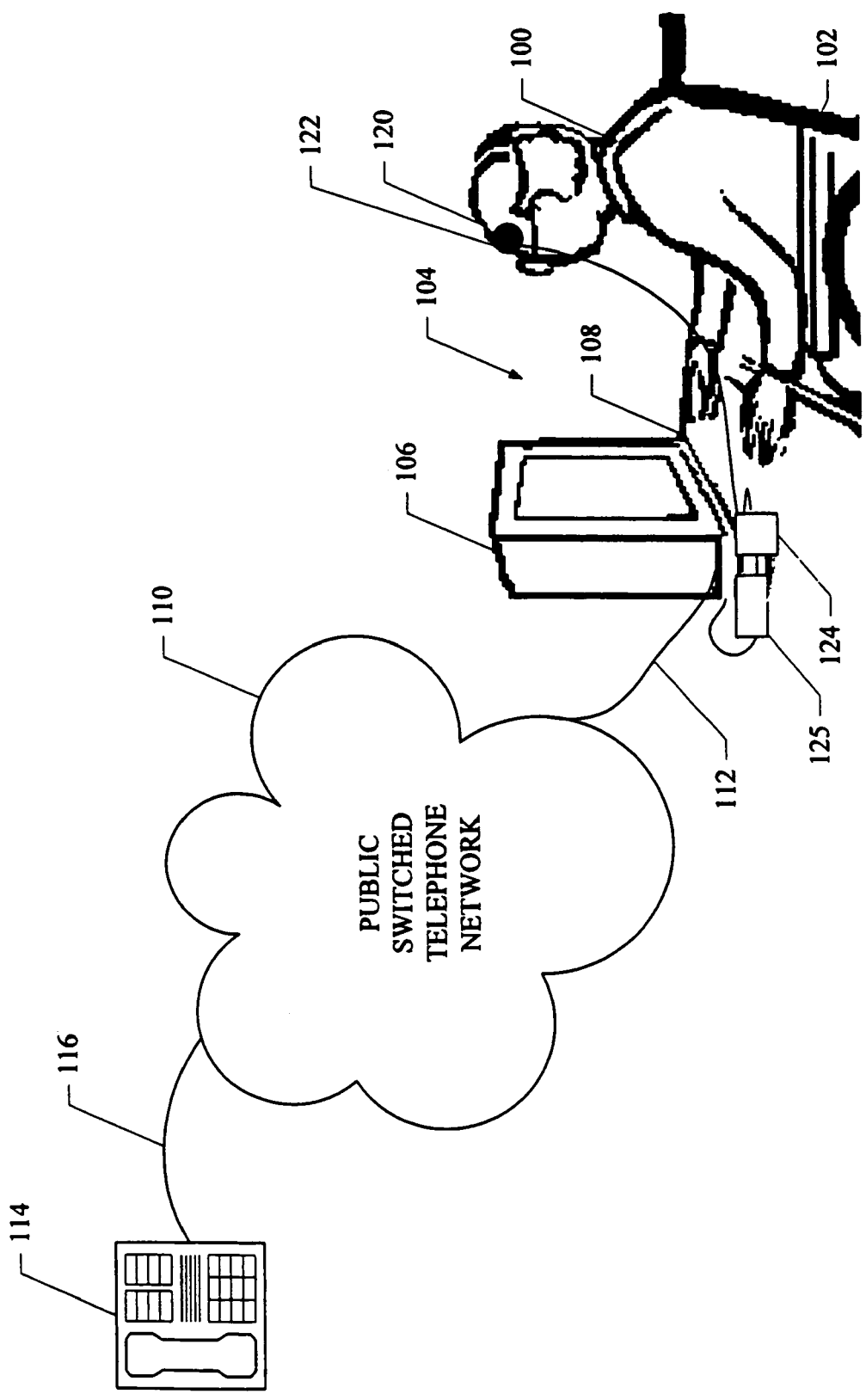
FIG. 1 is a block diagram illustrating a general system for implementing an exemplary embodiment of this invention.

FIG. 1 is an illustration of an exemplary embodiment of this invention. In this illustrative example, a handicapped individual too is seated in a wheelchair 102 in front of a personal computer ("PC") 104, which comprises a monitor 106 and a processing unit 108. PC 104 is connected to the public switched telephone network ("PSTN") 110 via a regular telephone line 112, as is known in the art. PSTN 110 comprises equipment such as telephone call switching and transmission equipment, as is well known in the art and is therefore not further described. For purposes of describing an exemplary embodiment of this invention, a destination telephone 114 is illustrated herein as a standard, landline telephone connected to PSTN 110 via another telephone line 116.

While this invention is described in the context of a wireline telephony network, a telephone interface for the handicapped according to this invention may also be implemented in a wireless network, an Internet telephony network or any combination of landline, wireless and Internet networks. While this invention is illustrated as implemented on PC 104, a telephone interface for the handicapped according to this invention may also be implemented on a laptop computer, on a dedicated telephony interface that integrates all of the characteristics of this invention into one unit or in any combination of computers and telephone instruments. While the destination telephone 114 is illustrated herein as a landline telephone, this invention is compatible with any telephony instrument that can send and receive calls, including, but not limited to, wireless telephones and Internet telephones. While this invention is illustrated as having a monitor 106, a large screen television set or projector may be useful to enlarge the image adequately for the individual 100. Additionally, destination telephone 114 can also comprise another telephone interface for the handicapped as described herein.

For purposes of this specification, the pronouns used for the handicapped individual 100 are "he," "him" and "his." These pronouns are not to be deemed to limit the gender of the users of this invention. Instead, these pronouns are used herein in the inclusive sense of "he or she," "him or her" and "his or hers."

In the context of FIG. 1, individual 100 cannot voluntarily control the movement of his hands and cannot speak intelligibly. Individual 100 can understand communication and can move at least one voluntary muscle at will. In this instance, individual 100 can control a muscle in his forehead 120. A sensor 122 is placed in contact with the voluntary muscle in the individual's forehead 120 and is connected to a sensor switch 124. Sensor 122 and sensor switch 124 cooperate to generate a signal when individual 100 moves the voluntary muscle in his forehead 120. The sensitivity of sensor 122 may be adjusted to the ability of individual 100. While this invention is described in connection with a voluntary muscle in the individual's forehead 120, sensor 122 may be in contact with any voluntary muscle, as will be apparent to one skilled in the art after studying this specification.

Sensor switch 124 generates an electrical signal, which is used as input to a switch interface 125. Switch interface 125 generates an input signal that is recognizable by PC 104. The input signal may be a "mouse click," an "enter key," a "right click," or any other input signal. According to one embodiment of this invention, sensor 122 and transducer 124 may be the sane or similar to the 722WB Sensor Switch, manufactured by Don Johnston Incorporated, Volo, Ill., having a web site at http://www.donjohnston.com. The specifications for this sensor switch are incorporated herein by reference in their entirety. PC 104 can thus be controlled by individual 100 voluntarily moving his forehead 120.

PC 104 displays a series of screens on monitor 106. These screens, as will be discussed further, below, have areas that are periodically "active." For purposes of describing this invention, the menu is "scanned" by making areas of the menu periodically active. Thus, when an area that the individual 100 wants to select is active, individual 100 moves his forehead muscle 120, which causes a sensor 122 to produce a signal, transducer 124 to translate that signal into a mouse click (for example), which selects the area.

Figure 2:
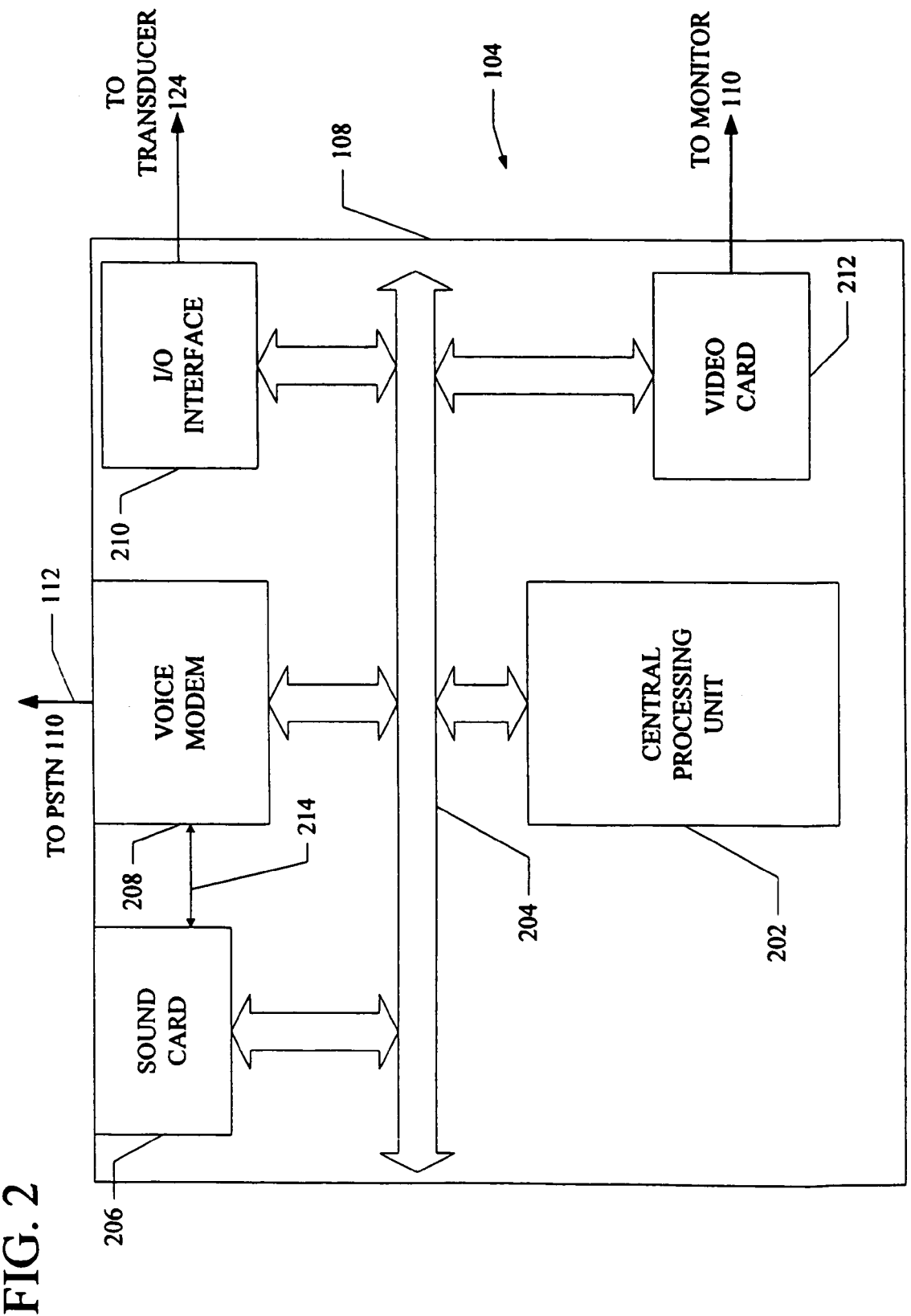
FIG. 2 is a block diagram illustrating the operative components of a typical PC on which an exemplary embodiment of this invention may be implemented.

Turning now to FIG. 2, a block diagram of the operative components of processing unit 108 of PC 104 is shown. At the heart of processing unit 108, a central processing unit 202 controls and coordinates the system, as is known in the art. Central processing unit 202 is illustrated here as connected to a main bus 204. Main bus 204 is, advantageously, a PCI bus.

A sound card 206 is connected to bus 204. Sound card 206 provides sound output to the individual 100 via speakers, headphone or other audio device. Sound card 206 may optionally provide text-to-speech translation, either alone or in conjunction with central processing unit 202, voice modem 208 or both. Sound car suitable for this purpose are widely available and therefore not further discussed.

A voice modem 208 is also connected to bus 204. Voice modem 208 provides an interface between processing unit 108 and the PSTN 110 via telephone line 112. Voice modem 208 provides control of telephone line 112 (i.e., off-hook, on-hook, dual-tone, multi-frequency signaling, etc.) as is known in the art. For purposes of providing outgoing speech and hearing incoming speech (and other signals), voice modem 208 can be independently connected to sound card 106 via connector 210. Suitable voice modems (also called "voice/fax/modems") are also well known in the art.

I/O interface 210 is illustrated herein as connected to bus 204. I/O interface 210 receives the input signals from transducer 124 and delivers the input to central processing unit 202. I/O interface 210 comprises, for example, a PS2 interface or a USB interface. Other types of I/O interfaces may be appropriate, depending upon the transducer 124. Further, I/O interface 210 may be connected to central processing unit 202 in any manner, not necessarily by bus 204.

Video card 212 is also illustrated as connected to bus 204. Video card 212 receives video output and delivers it to monitor 106, as is known in the art. Video card 212 may be any suitable commercially available video card, whether connected to bus 204 as illustrated or connected in another manner.

Figure 3:
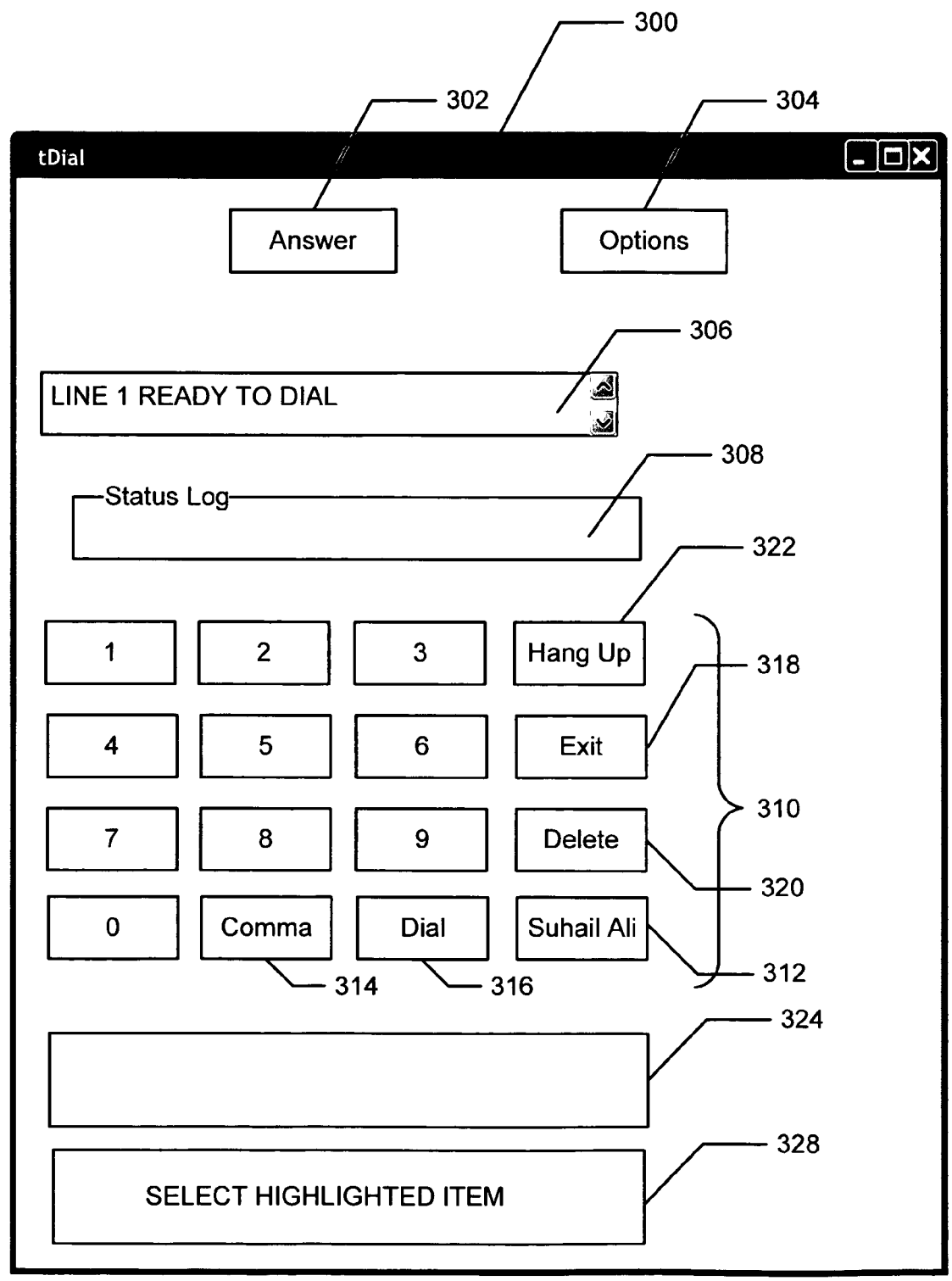
FIG. 3 is a computer screen shot of a first menu according to an exemplary embodiment of this invention.

An exemplary embodiment of the operation of the present invention is now described in the context of the telephone interface for the handicapped as described in FIG. 1 in conjunction with the screen shots of FIGS. 3 though 5. The handicapped individual 100 is moved into proximity of PC 104 so that he can read monitor 106 and sensor 122 is placed on his forehead 120. The sensor 122 is attached, in the exemplary embodiment, with medical tape. Other means for holding sensor 122 in proximity to forehead 120 can also include a harness, a head band or other removable appliance.

PC 104 is started and a program operating this invention is initiated. FIG. 3 is a screen shot of a first screen 300 that individual 100 sees upon initialization. First screen 300 comprises a picture that is similar to the familiar touch-tone telephone keypad. Further, first screen 300 follows familiar principals of most PC interfaces. Each key that can be active is shown in black. Keys that cannot be active are shown in grey ("greyed out" as used in the art).

Moving from top to bottom in the example of FIG. 3, an Answer key 302 is illustrated as greyed out and therefore not selectable. This key becomes active when there is an incoming call. Likewise, an Options key 304 is also greyed out and not selectable. A status box 306 shows the current status of telephone line 112. A Status Log 308 provides a history file to aid the individual 100 in keeping track of what he is doing and has done so far.

A keypad 310 provides selectable numbers "1" through "0" and other telephony functions. These other functions include speed dial key 312, which is shown herein labeled with the name of a person (illustrated herein as "Suhail Ali") to speed dial, Comma 314 to provide a pause in dialing (as is known in the art), a Dial key 316 to dial a number after it is entered, an Exit key 318 to quit the program and a Delete key 320 to delete the last selection. A Hang Up key 322 is shown greyed out, indicating that it is not active. When a call is in process, the Hang Up key 322 is activated.

An entry box 324 shows the individual 100 what he selected so far. Finally, an instruction box 328 provides the individual 100 with instructions as to what he can do.

Importantly, and in accordance with this exemplary embodiment of this invention, each active key is highlighted for a predetermined period of time, which is referred to herein as "scanning." In the example of FIG. 3, the number 3 key is highlighted. Highlighting of keys may be in numeric order, left-to-right, top-to-bottom or in any order that is most intelligible to individual 100. The predetermined period of time may also be adjustable to meet the needs of the individual 100. It is not unusual that someone with multiple handicaps may be slow in recognizing when a desired key is highlighted. In accordance with experimentation, it is desirable to have each key highlighted for at least five seconds.

Further, highlighting is illustrated herein as a dark box. Other ways of highlighting will be apparent to one skilled in the art after studying this specification. For example, an active key may have a contrasting color relative to the background. An active key my also be enlarged to aid in identification.

As each key is highlighted, individual 100 may select the key by moving the voluntary muscle, such as the forehead 120 illustrated in FIG. 1. Sensor 122 senses this movement and generates a signal. Transducer 124 sends a computer-recognizable signal to PC 104. The action associated with the highlighted key is thus executed. In the example of FIG. 3, the "3" key is selected and would then be displayed in box 324. When an entire telephone number is in box 324, (for example, the telephone number of telephone 114) individual 100 selects the Dial key 316, which causes PC 104 to dial the telephone number shown in box 324 via modem 208.

Figure 4:
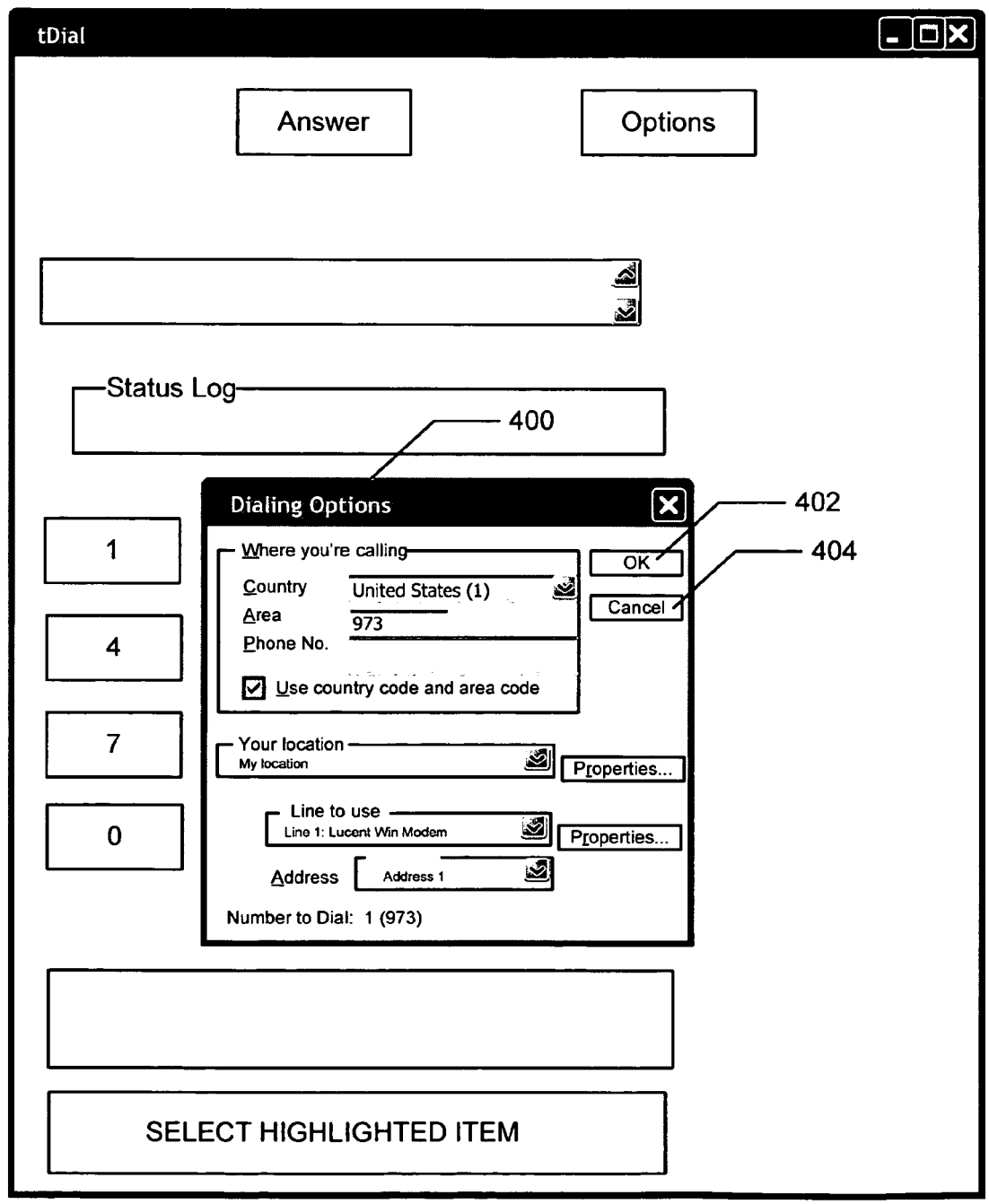
FIG. 4 is a computer screen shot of a screen shot to inform that user that dialing is in progress.

Turning now to FIG. 4, a screen shot of the dialing options screen 400 is shown. Screen 400 may be displayed when the options key 304 is selected. Screen 400 may also be displayed when dial key 316 is selected as a confirmation or feedback screen that a call is in progress. An OK key 402 may be selectable to confirm the dialing selection. Further, a cancel key 404 provides individual 100 with an opportunity to cancel the call if, for example, a wrong number was entered. The active keys are scanned in accordance with the description of FIG. 3, above.

Figure 5:
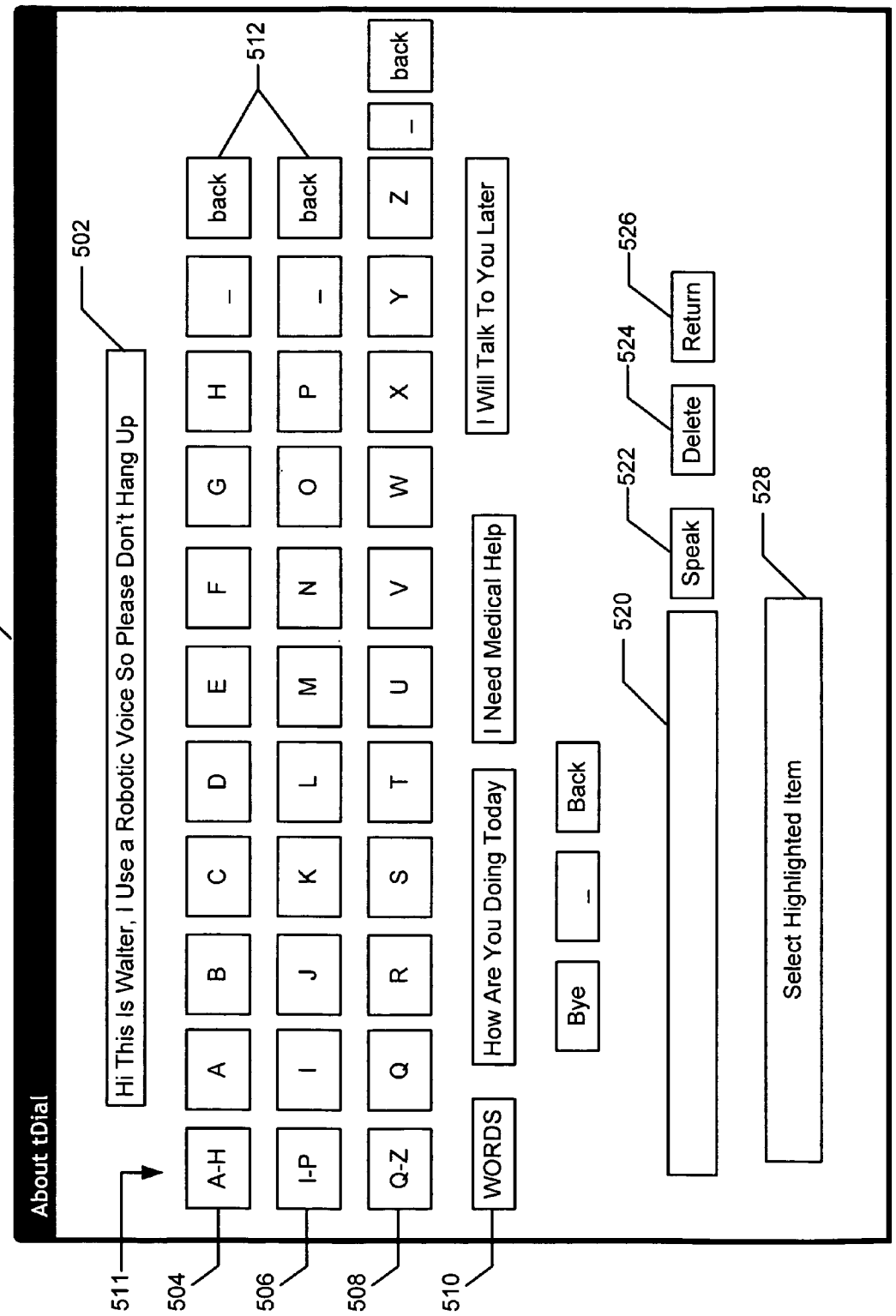
FIG. 5 is a computer screen shot of a second menu according to an exemplary embodiment of this invention.

Turning now to FIG. 5, a screen shot of a communication screen 500 according to another aspect of the current invention is shown. Communication screen 500 generally provides words, phrases and an alphabet keypad that individual 100 may use to select outgoing speech. For example, a first key 502 contains the phrase "Hi, this is Walter, I use a robotic voice so please don't hang up." This phrase is used, for example, as the first statement after a call is completed.

In the exemplary embodiment of FIG. 5, scanning first proceeds down the left column. The keys "A–H" 504, "I–P" 506, "Q–Z" 508 and Words 510 are highlighted and active periodically. The system illustrated in FIG. 5 provides an expeditious method of grouping letters, words and phrases so that individual 100 does not have to wait for every key on the screen to become active. When a key in the left column 511 is selected, the horizontal line of keys is then scanned. For example, when A–H key 504 is selected, the line of keys A through H, space (represented by an underscore) and back are scanned. A back key 512 is provided at the end of each line to end horizontal scanning and restart vertical scanning in the left column 511.

As a letter, word or phrase is selected, it is displayed in box 520. The speak key 522, delete key 524 and return key 526 are also periodically scanned. These keys control what happens with the words entered into display box 520. An instruction box 528 informs individual 100 of what actions he might take.

When the speak key 522 is selected, the contents of display box 520 are delivered to a text-to-speech engine, which provides verbal output through voice modem 208 and onto telephone line 112. The user of telephone 114 hears the synthesized speech and can then respond. Advantageously, the synthesized speech is also delivered to sound card 206 and played on an audio device that individual can hear in order to provide feedback. Further, anything said by the user of telephone 114 is played on the same audio device.

To end the call, individual 100 selects the return key 526, which changes the screen back to the screen of FIG. 3. The individual 100 then selects Hang Up key 322, which causes voice modem 208 to send an on-hook signal to PSTN 110 and disconnects the call.

Figure 6:
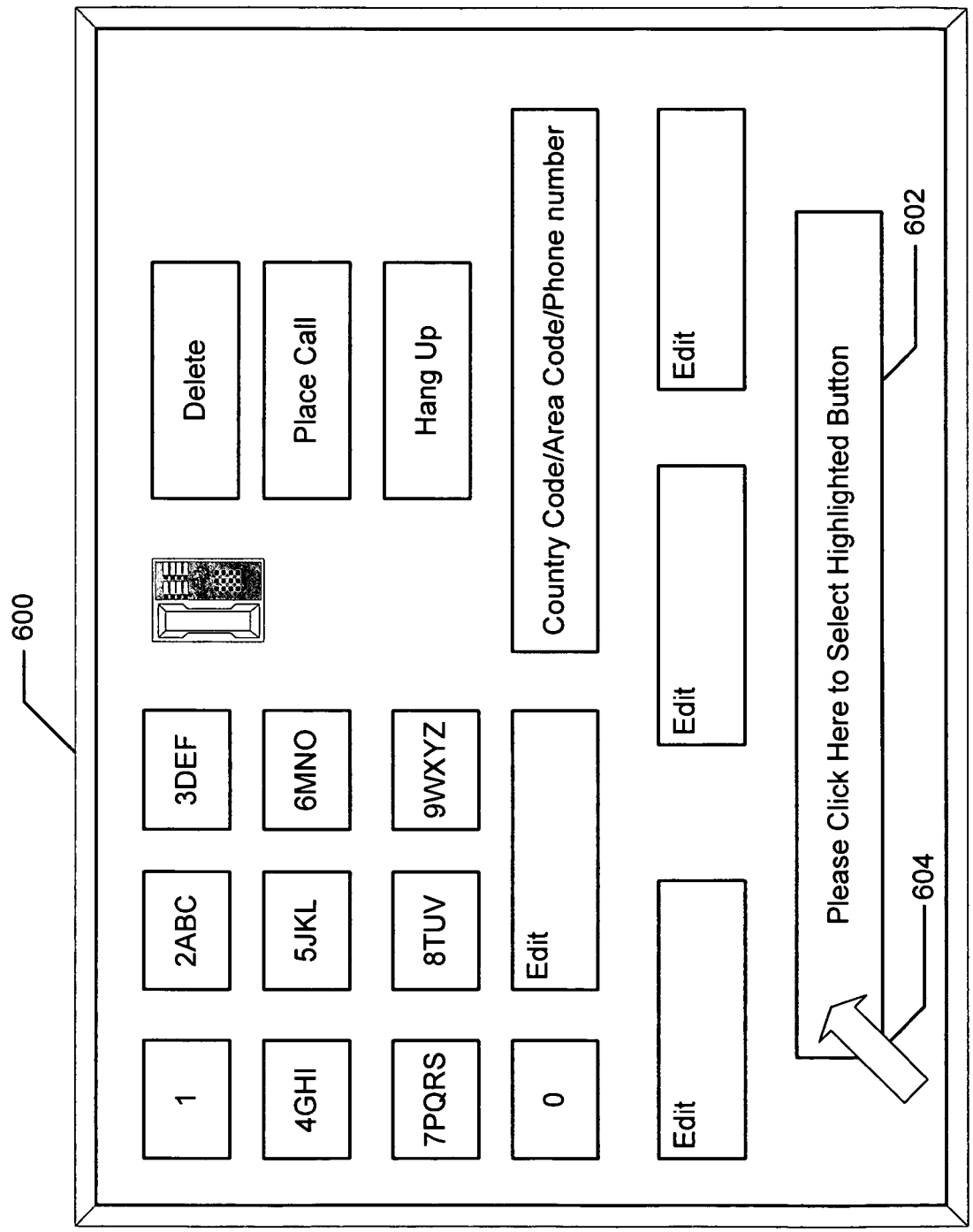
FIG. 6 is a computer screen shot of a menu according to another exemplary embodiment of this invention.

Turning now to FIG. 6, a screen shot 600 of another exemplary embodiment of a telephone dialing key pad is shown. As in the previous screens, each key is scanned, and thus highlighted and active for a predetermined period of time. Individual 100 selects an active key as described above. A bar 602 at the bottom of screen 600 indicates when a click is received. Mouse pointer 604 is programmed to remain in box 602. Further, if individual 100 can use a mouse to a limited extent, he can click on the bar 602 at the bottom of the screen when the desired key is highlighted.

Figure 7:
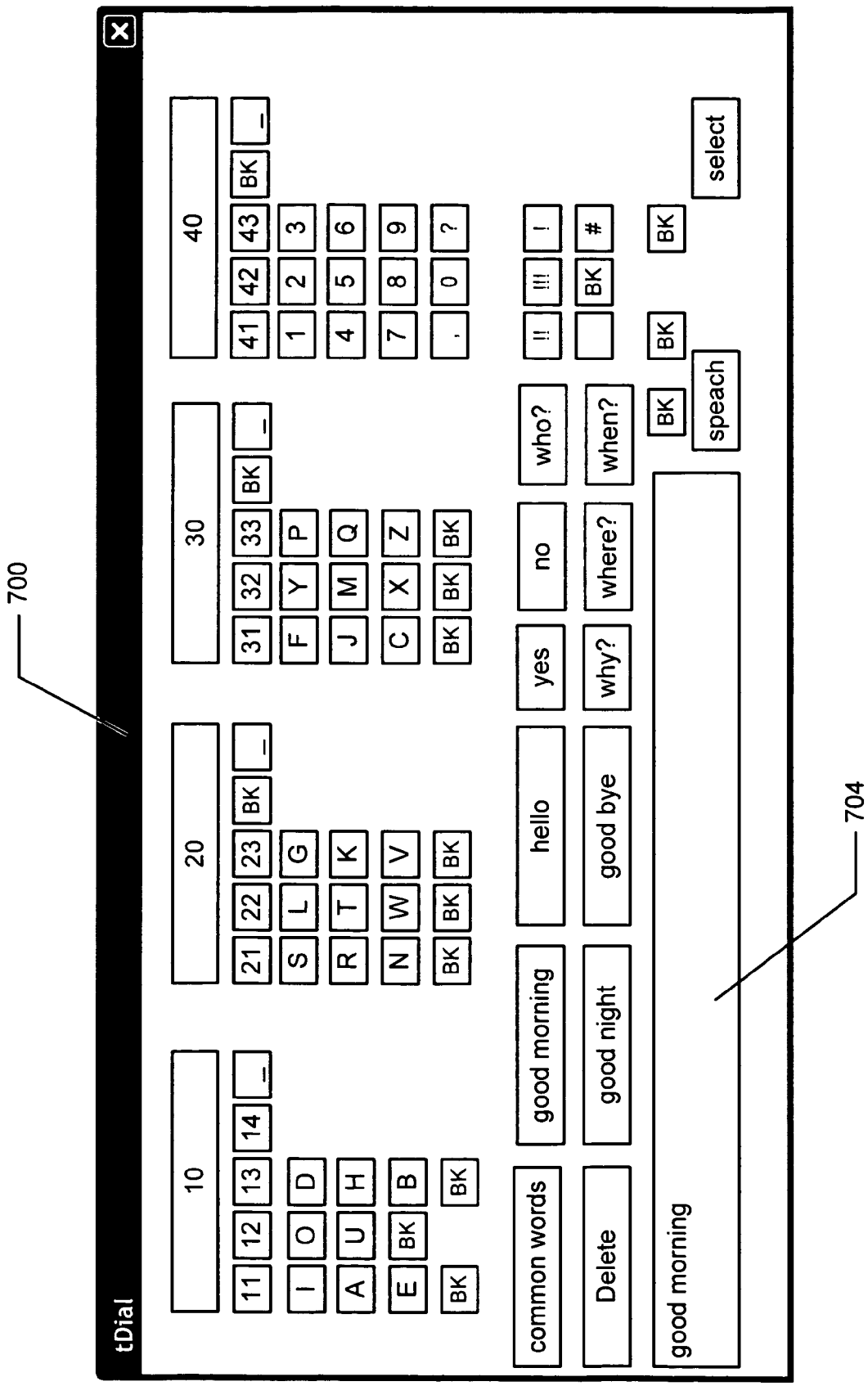
FIG. 7 is a computer screen shot of a menu according to a further exemplary embodiment of this invention.

Turning now to FIG. 7, a screen shot 700 of another exemplary embodiment of a communication screen is shown. On this screen, letters and numbers are grouped according to usage. Thus, letters that are likely to be used together are generally in the same group.

To choose a letter or common word, the keys 10, 20, 30, etc. are scanned. The user selects one of the keys. The keys within the selected category are then scanned for selection. Words and phrases to be communicated are displayed in display box 704. In this manner, individual 100 may be able to build his sentences more expeditiously.

It is to be understood that the above-described embodiment is merely illustrative of the present invention and that many variations of the above-described embodiment can be devised by one skilled in the art without departing from the scope of the invention. It is therefore intended that such variations be included within the scope of the following claims and their equivalents.

What is claimed is:

1. A telephone interface for a handicapped individual comprising:
   a processor configured to control the telephone interface;
   a public switched telephone network (PSTN) interface connected to the processor and to the PSTN;
   a sound generator connected to the processor and to the PSTN interface configured to generate synthesized speech responsive to said processor;
   an input device connected to the processor and including a sensor placed adjacent to a controllable voluntary muscle of an individual, the input device configured to generate a signal to the processor responsive to the sensor detecting voluntary muscle movement; and
   a display device connected to the processor and configured to display a first menu, the first menu comprising a plurality of telephony functions, the telephony functions including selectable preset telephone numbers and individual numbers that can be used to build a telephone number, wherein the processor is configured to control the PSTN interface according to receiving a signal when one of the telephony actions is active, the processor being further configured to cause the PSTN interface to initiate a telephone call based on the telephony functions of the first menu;
   the display device being further configured to, after the PSTN interface initiates the telephone call, display a second menu, the second menu comprising speech functions, the speech functions comprising words and phrases, wherein the processor is configured to cause the sound generator to generate speech according to receiving a signal when one of the words and phrases is active;
   the processor further configured to highlight an active area of each of the first and second menus responsive to the processor when each of the first and second menus are displayed, the processor being further configured to periodically change the active area of the displayed one of the first or second menus;
   the processor further configured to perform a function described by the active portion of the menu responsive to the signal.

2. A telephone interface in accordance with claim 1 wherein the sensor comprises a piezo-electric sensor configured to be responsive to voluntary muscle movement.

3. A telephone interface in accordance with claim 1 wherein the input device is configured to synthesize a mouse click responsive to the sensor detecting voluntary muscle movement.

4. A telephone interface in accordance with claim 1 wherein the second menu comprises alphanumeric characters and the processor is configured to build words according to the received signal when one of the alphanumeric characters is active.

5. A telephone interface in accordance with claim 1 wherein the processor is configured to scan the first and second menus cyclically.

6. A method for controlling a telephone interface for a handicapped individual, said telephone interface comprising a processor, a sound generator connected to the processor, a display connected to the processor, a telephone network interface connected to the processor and to the public switched telephone network (PSTN) and an input device connected to the processor and to a sensor that generates a signal in response to voluntary muscle movement of the handicapped individual, said method comprising:
   displaying a first menu on the display indicating a plurality of telephony functions, the telephony functions including selectable preset telephone numbers and individual numbers that can be used to build a telephone number;
   periodically making one area of the first menu active;
   performing one or more functions, related to initiating a telephone call, described by the active area of the first mean responsive to a signal from said input device
   initiating a telephone call based on the displayed functions on the first menu;
   displaying, after the phone call is initiated, a second menu, the second menu comprising speech functions, the speech functions comprising words and phrases;
   periodically making one area of the second menu active;
   causing the sound generator to generate speech according to receiving a signal when one of the words and phrases is active.

7. A method in accordance with claim 6 further comprising assembling alphanumeric characters into words, phrases or sentences by said processor and displaying the words, phrases or sentences at said display.

* * * * *